United States Patent
Backer et al.

(10) Patent No.: US 9,810,893 B2
(45) Date of Patent: Nov. 7, 2017

(54) PHASE MASK IMAGING WITH CHARACTERIZATION OF ROTATIONAL MOBILITY

(71) Applicant: The Board of Trustees of the Leland Stanford Junior University, Palo Alto, CA (US)

(72) Inventors: Adam S. Backer, Palo Alto, CA (US); Mikael P. Backlund, Palo Alto, CA (US); Alexander R. von Diezmann, Palo Alto, CA (US); Steffen J. Sahl, Göttingen (DE)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 190 days.

(21) Appl. No.: 14/670,193

(22) Filed: Mar. 26, 2015

(65) Prior Publication Data
US 2015/0277092 A1    Oct. 1, 2015

Related U.S. Application Data

(60) Provisional application No. 61/971,338, filed on Mar. 27, 2014.

(51) Int. Cl.
G02B 21/16    (2006.01)
G02B 21/02    (2006.01)
(Continued)

(52) U.S. Cl.
CPC .............. *G02B 21/16* (2013.01); *G01B 11/22* (2013.01); *G02B 21/0016* (2013.01); *G02B 21/02* (2013.01); *G02B 21/361* (2013.01)

(58) Field of Classification Search
CPC .... G01B 11/22; G02B 21/0016; G02B 21/02; G02B 21/16; G02B 21/361
See application file for complete search history.

(56) References Cited

U.S. PATENT DOCUMENTS 7,342,717 B1    3/2008    Hausmann et al.
7,705,970 B2    4/2010    Piestun et al.
(Continued)

OTHER PUBLICATIONS

Kao, H. P. and Verkman, A. S., "Tracking of Single Fluorescent Particles in Three Dimensions: Use of Cylindrical Optics to Encode Particle Position," Biophys. J. 67, pp. 1291-1300, (1994).
(Continued)

*Primary Examiner* — Francis M Legasse, Jr.
(74) *Attorney, Agent, or Firm* — Crawford Maunu PLLC

(57) ABSTRACT

Various imaging apparatuses, methods and their implementation are characterized herein. As may be implemented with one or more embodiments, a phase mask and optics operate to provide characterization of object depth and related rotational mobility of a feature corresponding to the object. In various implementations, the optics include a microscope having an objective and a detection pathway that operate with the phase mask for passing the light from the objective. Circuitry, such as light detector, processor or combination thereof operates with the phase mask and microscope to characterize the depth and rotational mobility, based on detected light passed via the microscope and the phase mask.

19 Claims, 6 Drawing Sheets

(51) Int. Cl.
  *G02B 21/36* (2006.01)
  *G01B 11/22* (2006.01)
  *G02B 21/00* (2006.01)

(56) References Cited

U.S. PATENT DOCUMENTS

| | | | |
|---|---|---|---|
| 8,558,873 B2 | 10/2013 | McEldowney | |
| 8,586,945 B2 | 11/2013 | Reuss et al. | |
| 8,608,314 B2 | 12/2013 | Yoon et al. | |
| 2006/0126921 A1 | 6/2006 | Shorte et al. | |
| 2006/0250620 A1* | 11/2006 | Hill | G01J 9/02 356/521 |
| 2006/0274394 A1 | 12/2006 | Riley et al. | |
| 2007/0146873 A1 | 6/2007 | Ortyn et al. | |
| 2008/0137059 A1 | 6/2008 | Piestun et al. | |
| 2010/0278400 A1 | 11/2010 | Piestun et al. | |
| 2011/0002530 A1 | 1/2011 | Zhuang et al. | |
| 2011/0096981 A1 | 4/2011 | Arnison et al. | |
| 2011/0174986 A1 | 7/2011 | Kempe et al. | |
| 2011/0249866 A1* | 10/2011 | Piestun | G06T 7/0048 382/103 |
| 2013/0147925 A1 | 6/2013 | Lew et al. | |
| 2015/0010236 A1* | 1/2015 | Chang | G06T 5/003 382/195 |

OTHER PUBLICATIONS

Piestun, R.; Schechner, Y. Y. and Shamir, J., "Propagation-Invariant Wave Fields with Finite Energy," J. Opt. Soc. Am. A, vol. 17, No. 2, (2000).
Thompson, R. E.; Larson, D. R. and Webb, W. W., "Precise Nanometer Localization Analysis for Individual Fluorescent Probes," Biophys J, vol. 82, pp. 2775-2783, (2002).
Ober, R. J.; Ram, S. and Ward, E. S., "Localization Accuracy in Single-Molecule Microscopy," Biophys J., vol. 86, pp. 1185-1200, (2004).
Prabhat, P.; Ram, S.; Ward, E. S. and Ober, R. J., "Simultaneous Imaging of Different Focal Planes in Fluourescence Microscopy for the Study of Cellular Dynamics in Three Dimensions," IEEE Transactions on Nanobioscience 3(4), pp. 237-242, (2004).
Betzig, E.; Patterson, G. H.; Sougrat, R.; Lindwasser, O. W.; Olenych, S.; Bonifacino, J. S.; Davidson, M. W.; Lippincott-Schwartz, J. and Hess, H. F., "Imaging Intracellular Fluorescent Proteins at Nanometer Resolution," Science, vol. 313, pp. 1642-1645, (2006).
Greengard, A.; Schechner, Y. Y. and Piestun, R., "Depth from Diffracted Rotation," Opt. Lett., vol. 31, No. 2, (2006).
Hess, S. T.; Girirajan, T. P. K. and Mason, M. D., "Ultra-high Resolution Imaging by Fluorescence Photoactivation Localization Microscopy," Biophys J., vol. 91, pp. 4258-4272, (2006).
Ram, S.; Prabhat, P.; Chao, J.; Ward, E. S. and Ober, R. J., "High Accuracy 3D Quantum Dot Tracking with Multifocal Plane Microscopy for the Study of Past Intracellular Dynamics in Live Cells," Biophys. J. vol. 95, pp. 6025-6043, (2008).
Huang, B.; Wang, W.; Bates, M. and Zhuang, X., "Three-Dimensional Super-Resolution Imaging by Stochastic Optical Resonstruction Microscopy," Science, vol. 319, p. 810, (2008).
Pavani, S. R. P. and Piestun, R., "Three Dimensional Tracking of Fluorescent Microparticles Using a Photon-Limited Double-Helix Response System," Opt. Express, vol. 16, No. 26, (2008).
Sun, Y.; McKenna, J. D.; Murray, J. M.; Ostap, E. M. and Goldman, Y. E., "Parallax: High Accuracy Three-Dimensional Single Molecule Tracking Using Split Images," Nano Lett. 9, pp. 2676-2682, (2009).
Shtengel, G.; Galbraith, J. A.; Galbraith, C. G.; Lippincott-Schwartz, J.; Gillette, J. M.; Manley, S.; Sougrat, R.; Waterman, C. M.; Kanchanawong, P.; Davidson, M. W.; Fetter, R. D. and Hess, H. F., "Interferometric Fluorescent Super-Resolution Microscopy Resolves 3D Cellular Ultrastructure," Proc. Natl. Acad. Sci. USA 106, 3125 (2009).

Piestun, Univ. of Colorado and published in S. R. P. Pavani, M. A. Thompson, J. S. Biteen, S. J. Lord, N. Liu, R. J. Twieg, R. Piestun, and W. E. Moerner, "Three-Dimensional Single-Molecule Fluorescence Imaging Beyond the Diffraction Limit Using a Double-Helix Point Spread Function," Proc. Nat. Acad. Sci. (USA) 106, 2995-2999 (published online, Feb. 11, 2009).
Tang, J.; Akerboom, J.; Vaziri, A.; Looger, L. L. and Shank, C. V., "Near-Isotropic 3D Optical Nanoscopy with Photon-Limited Chromophores," Proc. Natl. Acad. Sci. USA 107, pp. 10068-10073, (2010).
Badieirostami, M.; Lew, M. D.; Thompson, M. A. and Moerner, W. E., "Three-Dimensional Localization Precision of the Double-Helix Point Spread Function Versus Astigmatism and Biplane," Appl. Phys. Lett. 97, 161103, (2010).
Thompson, M. A.; Lew, M. D.; Badieirostami, M. and Moerner, W. E., "Localizing and Tracking Single Nanoscale Emitters in Three Dimensions with High Spatio-Temporal Resolution Using a Double-Helix Point Spread Function," Nano Lett. 10, pp. 211-218, (2010).
Pavani et al: "Three-dimensional, single-molecule fluorescence imaging beyond the diffraction limit by suing a double-helix point spread function", PNAS, Mar. 3, 2009, pp. 2995-2999.
Pavani et al: "Three dimensional tracking of fluorescent microparticles using a photo-limited double-helix response system", Optics Express, 2008.
Thomann et al: "Automatic fluorescent tag detection in 3D with super-resolution: application to analysis of chromosome movement", J. of Microscopy, 2002.
Juette, Three-dimensional sub-1 00nm resolution fluorescence microscopy of thick samples, 2008, Nat Methods 5:527-529.
E. Toprak et al., "Defocused orientation and position imaging (DOPI) of myosin V," PNAS 103, 6495-6499 (2006).
T. Gould et al., "Nanoscale imaging of molecular positions and anisotropies," Nature Methods 5, 1027-1030 (2008).
M. Backlund et al., "Simultaneous, accurate measurement of the 3D position and orientation of single molecules," PNAS 109, 19087-19092, (2012).
Davis et al., "Interferometric Synthetic Aperture Microscopy: Computed Imaging for Scanned Coherent Microscopy", Sensors 2008, 8, pp. 3903-3931.
Backlund et al., "The Role of Molecular Dipole Orientation in Single-Molecule Fluorescence Microscopy and Implications for Super-Resolution Imaging" ChemPhysChem 2014, 15, 587-599.
Toprak et al., "New Fluorescent Tools for Watching Nanometer-Scale Conformational Changes of Single Molecules Annual Review of Biophysics and Biomolecular Structure," vol. 36: 349-369 (Volume publication date Jun. 2007).
Backlund et al., "The Double-helix point spread function enables precise and accurate measurement of 3D single-molecule localization and orientation", Proc Soc Photo Opt Instrum Eng. Feb. 22, 2013; 8590.
M. Thompson et al., "Three-dimensional tracking of single mRNA particles in *Saccharomyces cerevisiae* using a double helix point spread function", PNAS 107, 17864-17871 (2010).
A. Gahlmann et al., "Quantitative Multicolor Subdiffraction Imaging of Bacterial Protein Ultrastructures in Three Dimensions", Nano Lett. 13, 987-993 (2013) Abstract.
T. Ha et al.,"Hindered Rotational Diffusion and Rotational Jumps of Single Molecules" PRL 80, 2093-2096 (1998) Abstract Only.
H. Sosa & E. Peterman et al., "ADP-induced rocking of the kinesin motor domain revealed by single-molecule fluorescence polarization microscopy" Nature Struct. Bio. 8, 540-544 (2001).
A. Backer et al., "Single-molecule orientation measurements with a quadrated puupil", Optics Lett., 38, 1521-1523 (2013).
Tseng, "Ultrafast Coherent Control Spectroscopy" dissertation, Stony Brook University, 2012.
Engelhardt, Johann, et al. "Molecular orientation affects localization accuracy in superresolution far-field fluorescence microscopy." Nano letters 11.1 (2010): 209-213.
M. Lew & M. Backlund, "Rotational Mobility of Single Molecules Affects Localization Accuracy in Super-Resolution Fluorescence Microscopy" Nano Lett. 13, 3967-3972 (2013).

(56) References Cited

OTHER PUBLICATIONS

Böhmer, Martin, and Jörg Enderlein. "Orientation imaging of single molecules by wide-field epifluorescence microscopy." JOSA B 20.3 (2003): 554-559.

Axelrod, Daniel. "Fluorescence excitation and imaging of single molecules near dielectric-coated and bare surfaces: theoretical study." Journal of microscopy 247.2 (2012): 147-160.

H. D. Lee, S. J. Sahl, M. D. Lew and W. E. Moerner, "The double-helix microscope super-resolves extended biological structures by localizing single blinking molecules in three dimensions with nanoscale precision" Appl. Phys. Lett. 100, 153701 (2012).

Lew, Matthew D., Alexander RS von Diezmann, and W. E. Moerner. "Easy-DHPSF open-source software for three-dimensional localization of single molecules with precision beyond the optical diffraction limit." Protocol exchange 2013 (2013).

Sahl, S. J., and W. E. Moerner. "Super-resolution fluorescence imaging with single molecules." Current opinion in structural biology 23.5 (2013): 778-787.

Rust, Michael J., Mark Bates, and Xiaowei Zhuang. "Sub-diffraction-limit imaging by stochastic optical reconstruction microscopy (STORM)." Nature Methods 3.10 (2006): 793.

Stallinga, Sjoerd, and Bernd Rieger. "Accuracy of the Gaussian Point Spread Function model in 2D localization microscopy." (2010).

Enderlein, Jörg, Erdal Toprak, and Paul R. Selvin. "Polarization effect on position accuracy of fluorophore localization." (2006).

Mortensen, Kim I., et al. "optimized localization analysis for single-molecule tracking and super-resolution microscopy." nature methods 7.5 (2010): 377.

J. R. Lakowicz, Principles of Fluorescence Spectroscopy, 3rd edn. (Springer Science, New York, 2006).

Chao, Jerry, E. Sally Ward, and Raimund J. Ober. "Fisher information matrix for branching processes with application to electron-multiplying charge-coupled devices."

Lord, Samuel J., et al. "Photophysical Properties of Acene DCDHF Fluorophores: Long-Wavelength Single-Molecule Emitters Designed for Cellular Imaging." J. Phys. Chem. A 111 (2007): 8934-8941.

Bates, Mark, et al. "Multicolor Super-Resolution Fluorescence Imaging via Multi-Parameter Fluorophore Detection." ChemPhysChem 13, 99 (2012).

Testa, Ilaria, et al. "Nanoscale separation of molecular species based on their rotational mobility." Opt.Express 16, 21093 (2008).

Lew, Matthew, et al., "Corkscrew point spread function for far-field three-dimensional nanoscale localization of pointlike objects", Optics Letters, vol. 36, No. 2 (Jan. 15, 2011).

Pavani, S., "Three-Dimensional Nanoscopy with a Double-Helix Microscope", Dissertation Abstracts International, vol. 71-01, Section B, p. 551 (2009).

\* cited by examiner

PHASE MASK IMAGING WITH CHARACTERIZATION OF ROTATIONAL MOBILITY

FEDERALLY-SPONSORED RESEARCH AND DEVELOPMENT

This invention was made with Government support under contract GM085437 awarded by the National Institutes of Health. The U.S. Government has certain rights in the invention.

FIELD

Aspects of various embodiments are directed to imaging, such as imaging via microscopy with depth and/or rotational mobility detection.

BACKGROUND

A variety of objects have been imaged using a variety of approaches, for acquiring a wealth of information. One imaging application involves the imaging of small or microscopic objects, using a microscope-type component. Various such approaches have involved the use of a different techniques for obtaining an image, such as by collecting light or other electromagnetic radiation.

However, obtaining information from small objects can be challenging. For instance, it can be difficult to image single molecules that can have fixed orientations of their emission dipoles, which can lead to asymmetric features in their fluorescence emission patterns. These anisotropic features can cause systematic mislocalization of the positions of individual molecules, which can ultimately lead to degraded resolution and imaging artifacts. This problem can be compounded by the effects of slight microscope defocus (e.g., $|\Delta z| \leq 250$ nm), which enhances asymmetric features and may lead to x-y errors (e.g., of up to ~200 nm). In this context, when a source of light is positioned at the focal plane of a microscope, rays of light emanating from the source will be collected by the microscope's optics, and refocused onto a detector (such as a camera sensor). The image formed by a single point of light is called the microscope's point-spread-function (PSF). While a microscope's PSF is useful for imaging two-dimensional slices of a specimen, objects that are a small distance away from the microscope's focal plane may appear blurry. Furthermore, it can be challenging to precisely measure relative depths of objects, as related to their distance from a plane of focus.

These and other matters have presented challenges to imaging, for a variety of applications.

SUMMARY

Various example embodiments are directed to imaging apparatuses, methods and their implementation.

According to an example embodiment, an apparatus includes a phase mask and optics that operate together to provide characterization of depth of objects within a specimen, and to provide characterization of rotational mobility of a feature corresponding to each object, using light passed from the object through the phase mask and the optics. In various embodiments, the optics include a microscope having an objective and a detection pathway that operate with the phase mask for passing the light from the objective. Circuitry, such as light detector, processor or combination thereof operates with the phase mask and microscope to characterize depth and rotational mobility of an individual object within a specimen (and of features of or otherwise corresponding to the individual object), based on detected light passed via the microscope and the phase mask.

Various embodiments are directed to methods, some of which may be implemented with one or more apparatuses as discussed herein. In accordance with one or more embodiments, a phase mask is used with a microscope having an objective and a detection pathway, by passing light from the objective and via the phase mask along the detection pathway. The depth of an individual object within a specimen, and the rotational mobility of a feature corresponding to the individual object, are respectively characterized based on the light passed via the detection pathway and the phase mask.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
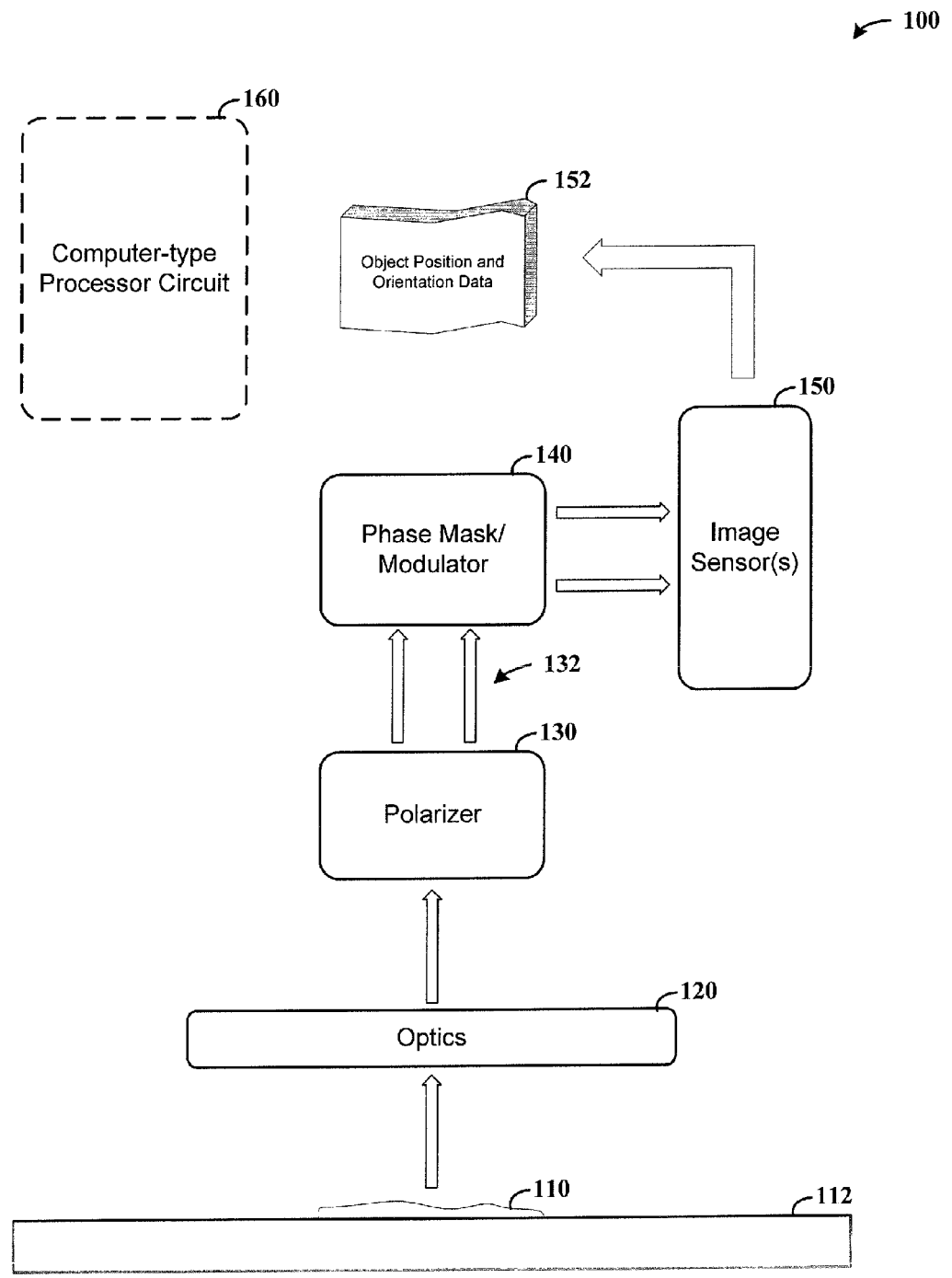
FIG. 1 depicts an imaging apparatus, in accordance with an example embodiment of the present disclosure.

While various embodiments discussed herein are amenable to modifications and alternative forms, aspects thereof have been shown by way of example in the drawings and will be described in detail. It should be understood, however, that the intention is not to limit the disclosures to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving imaging, and to a phase mask and its implementation involve measuring the depth of an object within a specimen. In some implementations, rotational mobility of features of the object are also characterized via the phase mask. In certain embodiments, aspects of the present disclosure have been shown to be beneficial when used in the context of microscopy involving estimation of axial depth and rotational mobility of particles, which may involve modifying a microscope's point spread-function (PSF) and/or facilitating the measurement of the three-dimensional position of particles. Certain implementations involve deducing overall rotational mobility within a sample by observing ensembles of particles with anisotropic angular emission distributions. While not necessarily so limited, various aspects may be appreciated through a discussion of examples using such exemplary contexts.

According to various example embodiments, aspects of the present disclosure are directed to addressing challenges relating to imaging approaches, including those discussed in the background above. For instance, various embodiments are directed to addressing challenges relating to the above aspects and others, as may benefit a variety of imaging implementations. Certain embodiments involve measuring or determining an indication of depth based upon a distance or distances between lobes of light from a specimen, as passed via a phase mask.

Aspects of the present disclosure are believed to be applicable to a variety of different types of apparatuses, systems and methods involving imaging approaches such as microscopy. While not necessarily so limited, various aspects may be appreciated through a discussion of examples using this context. Various such embodiments are described in Appendices A, B and C, which form part of the provisional patent document to which benefit is claimed (and to which reference below is made).

Various embodiments are directed to wedge-based phase masks, and for estimation of axial depth and rotational mobility of single particles in microscopy. In one such embodiment, a microscope's point-spread-function (PSF) is controlled to facilitate such estimation, such as by facilitating the measurement of a three-dimensional position of single particles. Such a phase mask may, for example, be implemented to delay propagation of a light wave through an optical system. Furthermore, when an ensemble of particles with anisotropic angular emission distributions have been observed, overall rotational mobility within the sample may be deduced.

In some embodiments, a phase mask approach is implemented using a bisected pupil (BSP) phase mask with a dual-polarization optical Fourier processing system, to measure both the position and dipole orientation of individual fluorescent molecules from a single camera image. In the context of single-molecule super-resolution microscopy, this technique permits one to diagnose, and subsequently to remove imaging artifacts resulting from orientation-induced localization errors. Where the molecules labeling a structure are rotationally mobile, dipole orientation errors are mitigated, facilitating super-resolution imaging in three dimensions.

Certain embodiments are directed to addressing challenges relating to fluorescence microscopy and other imaging approaches. For instance, such aspects may benefit from imaging techniques that resolve structures smaller than the wavelength of light, thus achieving what is sometimes referred to as 'super-resolution.' Related methods may include, for example, localizing sparse subsets of individual molecules, such as in Photoactivated Localization Microscopy (PALM) and stochastic optical reconstruction microscopy (STORM) methods. These methods rely upon the ability to spatially locate a single molecular label accurately from the image that its fluorescence forms on a wide-field camera.

Certain aspects of the present disclosure are directed towards microscopy, involving a phase mask for use in or as part of a microscope, in which the phase mask is used to characterize the depth of an individual object within a specimen as well as rotational mobility or behavior of a feature corresponding to the individual object. One or more aspects are directed to gauging rotational mobility of individual molecules labeling a structure of interest. Certain aspects further involve determining whether orientation-induced image artifacts are present. For immobile labels, certain aspects are directed to measuring orientations of emission dipole moments. Further aspects are directed to addressing challenges relating to increases in a rate of incorrect localizations, such as those in Photoactivated Localization Microscopy (PALM) and STORM techniques, and applicable to two-dimensional (2D) imaging. Further aspects are directed to acquiring super-resolved images in three dimensions from rotationally mobile labels.

One or more embodiments are directed to using a phase mask as discussed herein as a module installed on a conventional microscope. Instead of a point of light forming a single 'spot' on a detector (e.g., photodiode, camera sensor or other light detector), light passing through the phase mask is routed into two distinct points or 'lobes', displaced a few pixels from each other on the detector. As an object travels deeper within the sample, the distance between the two lobes increases, and as an object travels closer to the microscope optics, the lobe-distance shrinks. The spacing between lobes is measured and used to infer the depth (z) of the particle. The midpoint between the two lobes is also calculated and used to measure the lateral (x/y) position of the particle of interest.

In some implementations, multiple objects are simultaneously imaged at different depths within a sample. The phase mask is adjusted according to a desired depth range. A tunable extended depth of field (EDOF) parameter is used to facilitate imaging performance, such as when objects of interest are spaced over two microns from a native focal plane of a microscope objective.

In some embodiments, light-emitting particles are imaged, such as by imaging single fluorescent molecules that are highly anisotropic (the amount of light that the molecules emit in a given direction depends upon the orientation of the emission dipole moment of the particle with respect to the microscope optics). The two lobes of light that appear on the detector for such a molecule are not of equal brightness. Accordingly, many different particles are measured, or the same particle is measured for a prolonged period, and the relative brightness of the two lobes of each particle are used to infer whether the individual objects in the sample are fixed in their orientation, or if they are able to rotate freely. Other embodiments involve inferring depth from a separate measured spacing of such lobes.

Various embodiments are directed to 3D super-resolution microscopy studies, in which thousands to millions of individual fluorescent molecules within a biological sample of interest are rapidly imaged. Other embodiments are directed to tracking biomolecules with fluorescent labels, or characterizing other light emitting objects such as quantum-dots or the scattered light from gold beads or nanorods.

Certain embodiments are directed to constructing a 3-dimensional image of a biological structure with resolution surpassing the diffraction limit by up to an order of magnitude. In the context of single-particle tracking microscopy, various embodiments involving a phase mask are directed to precise positioning of individual sub-diffraction limited objects to be monitored, which can be used to track particles such as fluorescent molecules, quantum dots or the scattered light from gold beads or nanorods. The rotational mobility of anisotropic particles such as single molecules can be tracked in this regard. This can be used to provide insight to biological tracking studies such as measuring the mechanical properties of DNA, or understanding the movements of motor proteins. Rotational mobility data is also useful for diagnosing orientation-related image artifacts for super-resolution applications.

In some embodiments involving rotationally immobilized fluorophores, single-molecule PSFs are modulated in the Fourier plane with a BSP, and acquired images are fit with increased (x-y) accuracy for many orientations. For orientations that persist in causing pronounced localization error, such molecules are identified via Single-Molecule Active Control Microscopy (SMACM), and these spurious localizations are pruned from a final super-resolved image. Features of BSP-modulated single-molecule PSFs are analyzed along with polarization data to determine whether labels within a sample are sufficiently mobile such that orientational artifacts are mitigated. Furthermore, with emitters that are isotropic, the BSP is used to acquire 3D localization data.

A more particular embodiment is directed to a microscopy apparatus or method involving a phase mask for use in or as part of a microscope (e.g., in a detection pathway of the microscope). The phase mask is used to characterize or measure the depth of an individual object within a specimen (e.g., in a specific range to which the phase mask is tuned), as well as rotational mobility or behavior of a feature corresponding to the individual object. In certain embodiments, two or more such phase masks are used, together or as replacements, with each phase mask characterizing or measuring the depth of individual objects in a specific range to which the phase mask is tuned. The individual objects may include light-emitting structures smaller than the diffraction limit of the microscope, with the features being individual molecules. Such an object may include, for example, a single molecule, a biomolecule, a quantum dot or rod, a metallic or other light-scattering particle or nanorod, or an isotropic or anisotropic particle. In some implementations, the depth and the rotational mobility or behavior are concurrently obtained.

In some embodiments, three-dimensional (3D) image construction is carried out for individual ones of the objects and/or features corresponding thereto, with resolution that is better than the diffraction limit of the microscope. This may facilitate improvement of the overall resolution of the microscope by an order of magnitude or more for individual objects that are sufficiently bright.

The microscopy apparatuses as discussed herein may be implemented in a variety of manners. In some embodiments, a phase mask and microscope operate as a dual-polarization optical Fourier processing system for measuring both the depth and dipole orientation of individual fluorescent molecules from a single camera image. In certain embodiments, a phase mask includes a linear, wedge shaped phase ramp, partitioning a microscope pupil (used to collect light from the specimen) into two halves. Such a phase mask may further counteract the phase-distortion effects of microscope defocus, thus extending the applicable depth range of the apparatus.

In certain embodiments, a phase mask and microscope pass emitted fluorescence through a Fourier transforming lens, and the emitted fluorescence is separated into a plurality of imaging channels for light transmitted and reflected by a polarizing beam splitter. The polarizing beam splitter may, for example, provide polarization channels from which processed light is modulated as a function of the phase mask. The polarization channels may relay the processed light to a module having a spatial light modulator programmed with the phase mask, such that the polarization of the channels corresponds to the orientation of the phase mask.

Various apparatuses are implemented with phase mask approaches as discussed herein. In one embodiment, an apparatus includes a substrate including at least one of a transmissive glass or polymer, and a phase mask layer formed on the substrate. The phase mask layer includes variations in the substrate thickness that enforces a phase response, and may be of similar or different material, relative to the substrate. In various embodiments, the phase mask includes a glass or glass-type material. In another embodiment, an apparatus includes a programmable phase-modulating spatial light modulator (SLM), and a phase mask formed on the surface of the SLM by configuring the SLM with a desired phase response. Another embodiment is directed to a microscopy system including a phase mask, a microscope having an objective and a detection pathway that operates with the phase mask for passing light from the objective, and a mechanism (including circuitry and computational algorithms) that characterizes or measures the depth of an individual object within a specimen as well as the rotational mobility or behavior of a feature corresponding to the individual object, using the phase mask.

A variety of lenses and other optics are used with various embodiments. In some embodiments, a microscope objective lens is substituted with a photographic lens that is used to determine the depths of individual objects appearing in a photograph. Such objects may include individual light-emitting or reflective markers used in a motion-capture system, where determination of both the depths and orientations of the objects from a single image is provided. In other embodiments, a microscope objective lens is substituted with a high-aperture terrestrial or astronomical telescopic optical system, which is used to determine/estimate both distances from an observer and the orientations of objects from a single image using anisotropic properties of emitted or reflected light from the objects.

The embodiments and specific applications discussed herein may be implemented in connection with one or more of the above-described aspects, embodiments and implementations, as well as with those shown in the figures, in Appendices A, B and C of the underlying provisional application as well as in Backer et al., "A bisected pupil for studying single-molecule orientational dynamics and its application to three-dimensional super-resolution microscopy," Appl. Phys. Lett. 104, 193701 (2014) (e.g., pertaining to Appendices A and B), and in the documents listed therein, all of which are fully incorporated herein by reference.

Turning now to the figures, FIG. 1 shows an imaging apparatus 100, shown by way of example as imaging a specimen 110 on an imaging platform 112, in accordance with an example embodiment of the present disclosure. The apparatus 100 includes optics 120 (e.g., one or more lenses), an optional polarizer 130 (e.g., a beamsplitter), which splits polarized light received from the specimen 110 (e.g., p- and s-polarized light). The apparatus 100 further includes a phase mask/modulator 140 that separates each object point from the specimen 110 into two lobes within each polarization channel, each lobe including light impinging upon a top or bottom half of a Fourier plane.

Light from the phase mask/modulator 140 is passed via a lens 141 to an image sensor (or sensors) 150, which detect the lobes of light such as by using different regions of an image sensor and/or using different sensors for each lobe. The detected lobes are used to provide output data 152 that is indicative of object position and orientation of the specimen 110 (e.g., of a molecule in the specimen). This information can be provided to a computer-type processor circuit 160, which may also be implemented as part of the apparatus 100. In some implementations, the processor circuit 160 and/or other aspects of the apparatus 100 operate to detect a depth (z, relative to the optics 120 and/or a focal plane thereof) of a molecule or molecules in the specimen 110, by measuring the spacing between lobes detected at the image sensor 150. This spacing can be used, for example, in a manner consistent with that described in the Appendices and algorithms therein, for estimating position. In certain implementations, a midpoint between the detected lobes is detected and used to determine the lateral (x/y) position of a particle of interest in the specimen 110. Further, rotational mobility may be estimated or determined using detected characteristics of the lobes, as may relate to spacing and intensity. In yet other embodiments, tradeoffs between positional information and orientation for a particle being imaged are gauged and used to obtain desirable data. For instance, linear dichroism and lobe asymmetry may be used to infer rotational mobility. For general information in this regard, and for specific information regarding approaches to inferring rotational mobility that may be used in connection with one or more embodiments, reference may be made to Backer et al., "Extending Single-Molecule Microscopy Using Optical Fourier Processing," J. Phys. Chem. B 2014, 118, 8313-8329 (e.g., as shown in histograms of FIG. 11 therein), which is fully incorporated herein by reference.

Figure 2A:
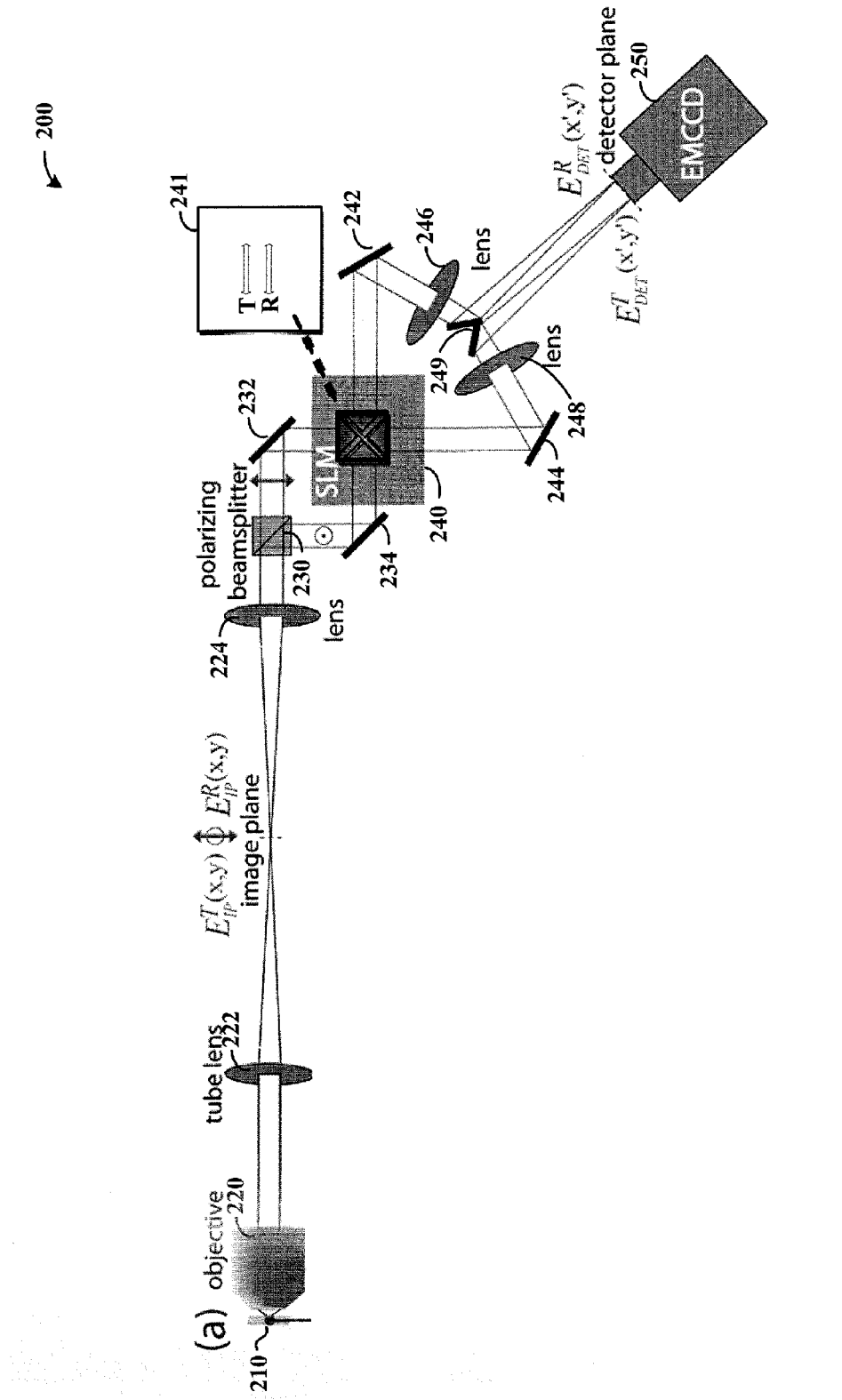
FIG. 2A depicts another imaging apparatus, in accordance with an example embodiment of the present disclosure.

FIG. 2A depicts another imaging apparatus 200, in accordance with an example embodiment of the present disclosure. The apparatus 200 includes an objective lens 220 for collecting light from a specimen 210, a tube lens 222 and a further lens 224. A polarizing beamsplitter 230 splits light from the specimen 210 as passed via the lenses 220, 222 and 224, and passes the light via mirrors 232 and 234 to a spatial light modulator 240. The polarizing beamsplitter 230 separates the light into two imaging channels T and R, respectively for light transmitted and reflected by the beamsplitter (and containing p- and s-polarized emissions, respectively). The spatial light modulator 240 includes a phase mask function 241, and passes light to mirrors 242 and 244, lenses 246 and 248, and mirror arrangement 249 (e.g., two nearby mirrors facing in different orientations) to a detector 250. The light detected at detector 250 includes characteristics indicative of the depth of an individual object within the specimen 210, and rotational mobility or behavior of a feature corresponding to an individual object in the specimen 210.

Figure 2B:
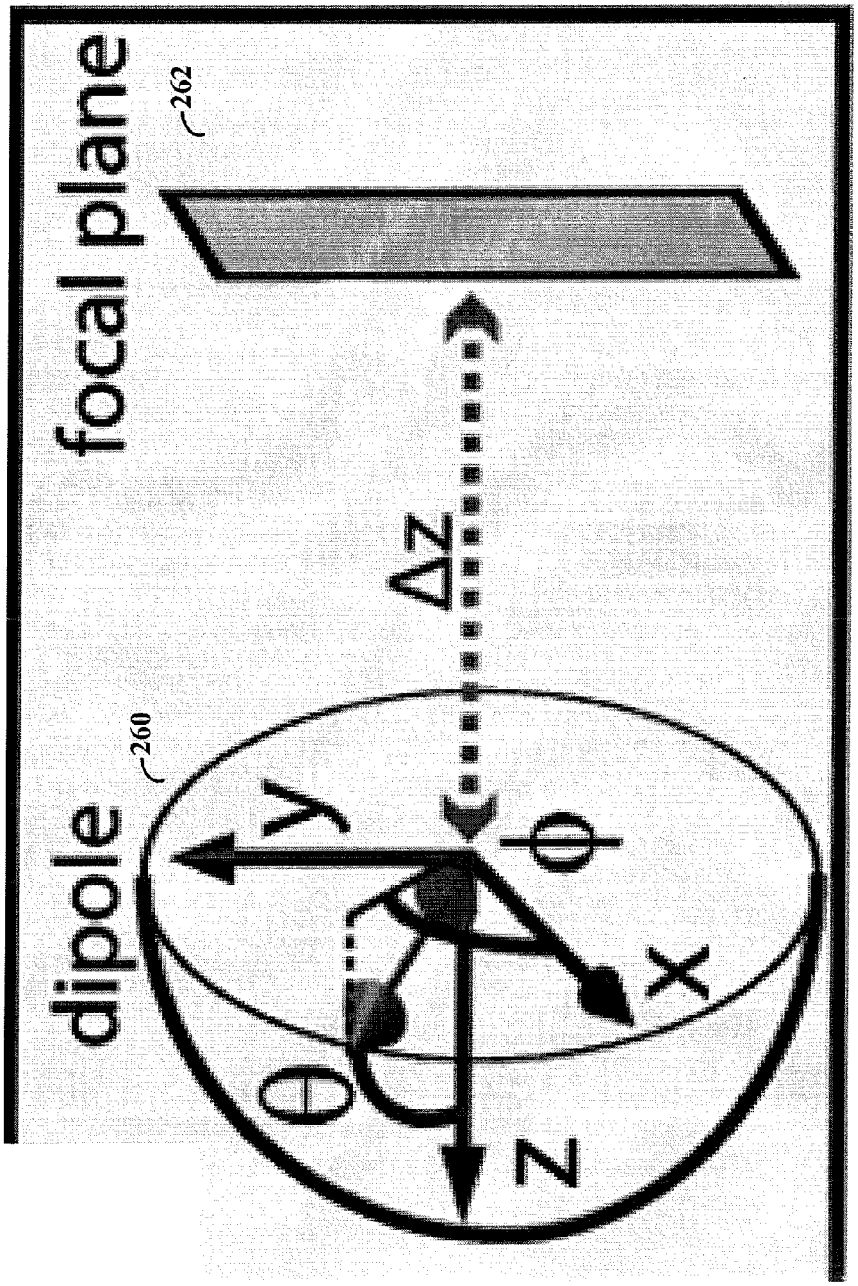
FIG. 2B depicts a coordinate system for reporting object position and orientation as may be implemented with the apparatus in FIG. 2A, in accordance with an example embodiment of the present disclosure.

FIG. 2B depicts a coordinate system for reporting object position and orientation, as may be implemented with the apparatus in FIG. 2A, in accordance with another example embodiment. A dipole orientation of the specimen is represented at 260, with x, y and z directions as shown, and polar/azimuthal orientation parameterized by the two angles θ and φ respectively. The parameter Δz specifies the distance from a focal plane 262 of an optical arrangement used to image the specimen. Polarization channels T and R are relayed onto a liquid crystal SLM programmed with a BSP phase mask.

Figure 2C:
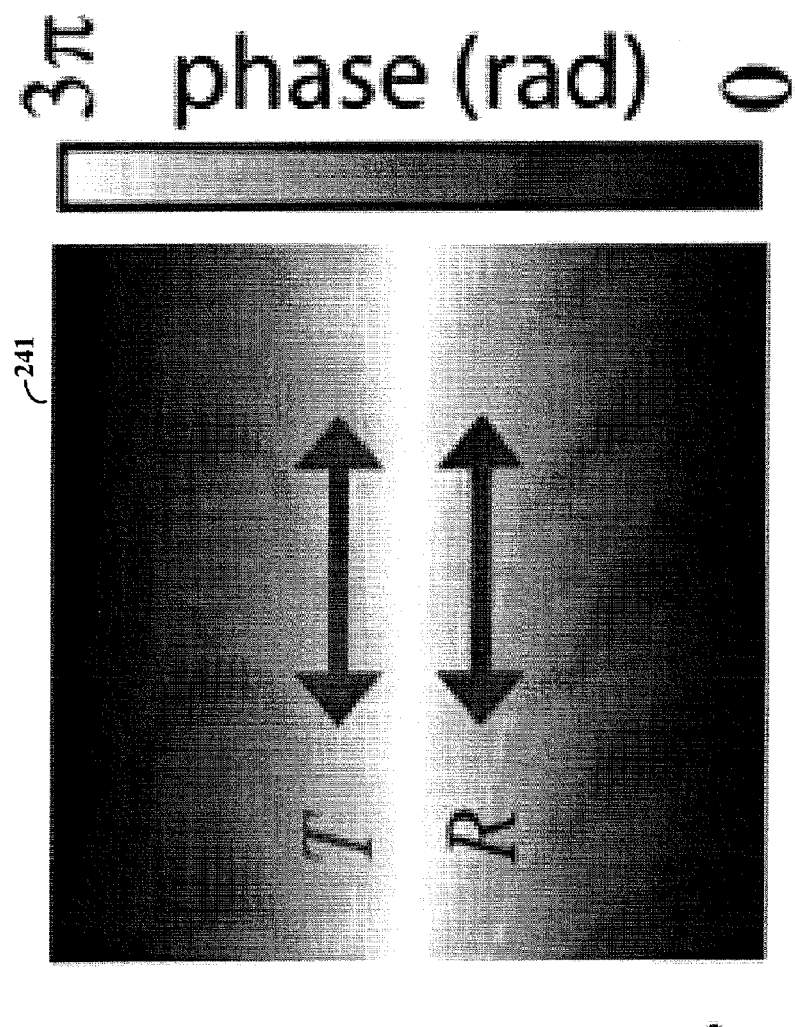
FIG. 2C depicts a phase mask as may be implemented with the apparatus in FIG. 2A, in accordance with an example embodiment of the present disclosure.

FIG. 2C depicts a phase mask 241, as may be implemented with the SLM 240 in FIG. 2A, in accordance with another example embodiment. The phase in radians is shown to be near zero at upper and lower edges, and near 3π along a horizontal center line.

Figure 2D:
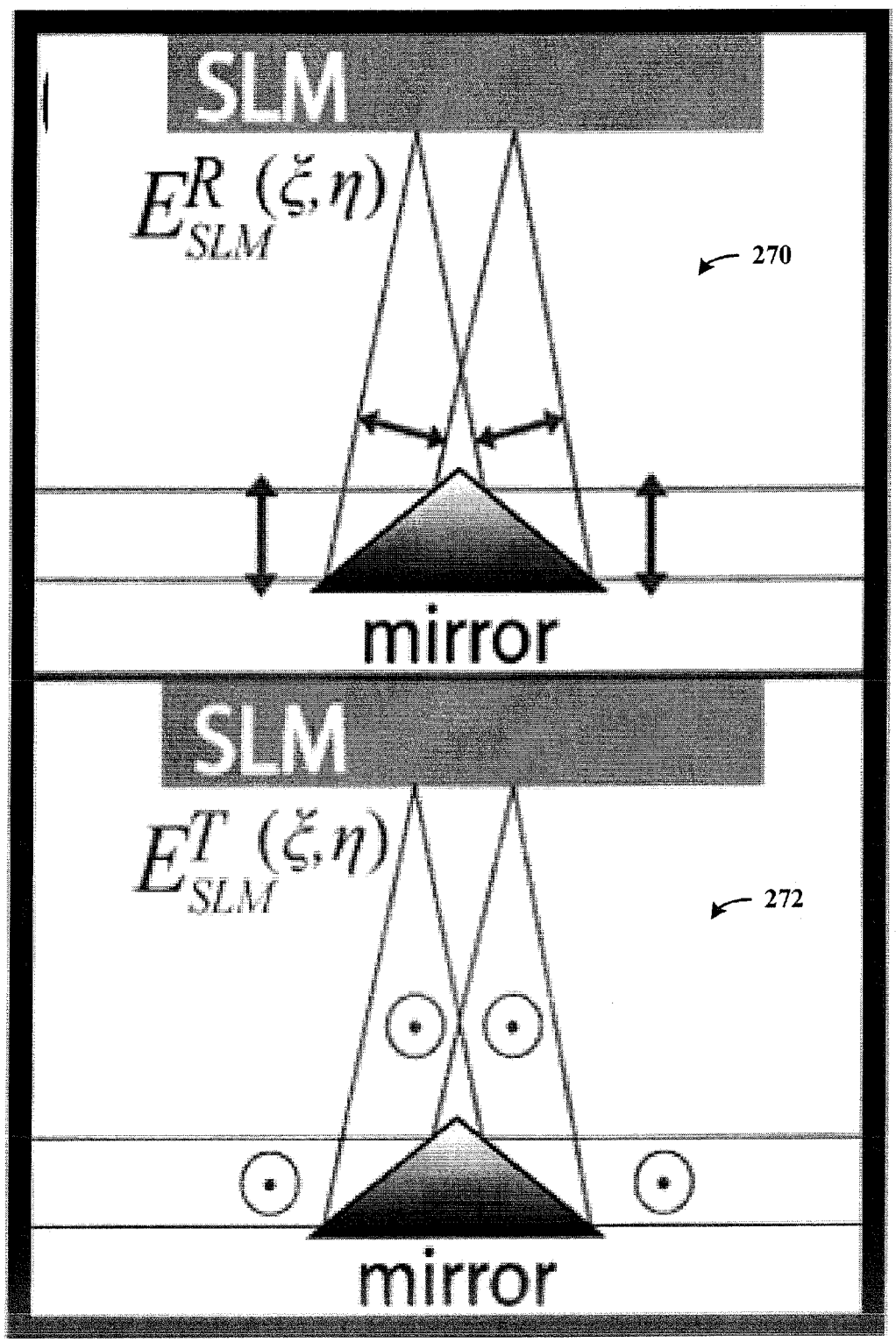
FIG. 2D depicts a side view of a phase mask/modulator as may be implemented with the apparatus in FIG. 2A, in accordance with an example embodiment of the present disclosure.

FIG. 2D depicts side views 270 and 272 of a phase mask/modulator apparatus with a mirror, such as may be implemented with the SLM 240 in FIG. 2A, in accordance with another example embodiment. Light rays are passed as shown, reflected off the mirror, the SLM and back off the mirror. Each of side views 270, 272 represents light rays in a respective one of the polarization channels T and R.

Referring again to FIG. 2A and in accordance with certain embodiments, a pyramidal mirror (e.g., as in FIG. 2D) is used with the SLM 240 to ensure that the polarization of respective channels (T and R) is identical (or nearly identical) with respect to the orientation of the phase mask 241. After phase modulation, both polarization channels are Fourier transformed by another lens (246, 248), and projected onto separate regions of an EMCCD image sensor (as detector 250). The phase modulation, $\psi(\xi, \eta)$, imparted by the bisected pupil may be expressed as:

$$\psi(\xi,\eta)=C_0-C(|\eta|) \qquad (1)$$

where $(\xi,\eta)$ are spatial coordinates at the Fourier plane, and $C_0$ and $C$ are empirically adjustable constants.

Figure 3:
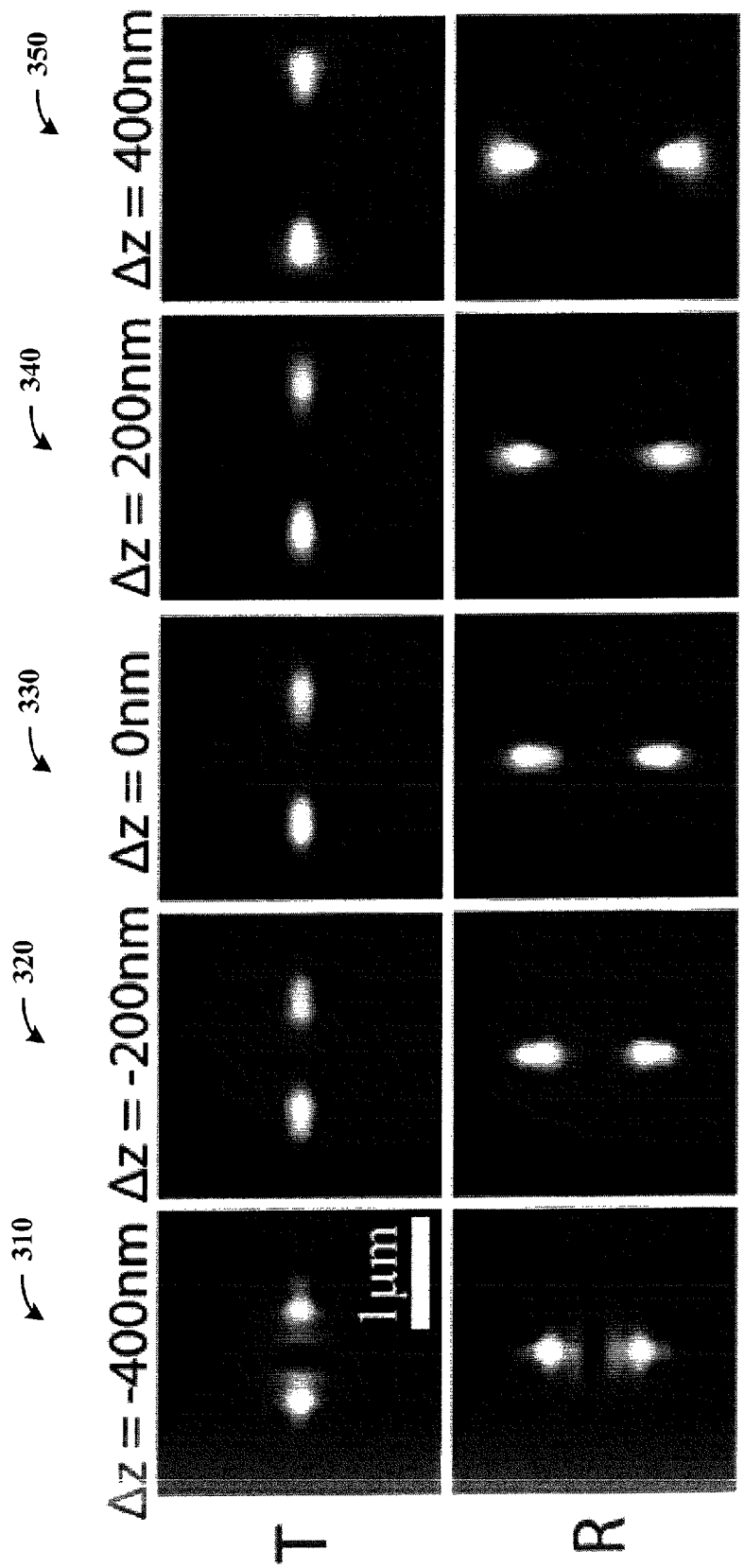
FIG. 3 depicts images of respective lobes within polarization channels, as may be implemented with one or more embodiments.

FIG. 3 depicts images of respective lobes within polarization channels, as may be implemented with one or more embodiments, such as those shown in FIGS. 2A-2D. Images are shown for the T and R channels at distances Δz of -400 nm (310), -200 nm (320), 0 nm (330), 200 nm (340) and 400 nm (350). A phase mask separates each object point into two 'lobes' within each polarization channel of the image plane, each composed of light impinging upon the top or bottom half of the Fourier plane. If an emitter in the object plane is isotropic, the two lobes will have equal intensity. However, if the angular distribution of intensity varies, the two lobes will not be of equal brightness. The brightness of each of the lobes in both of the polarization channels provides insight into determining the dipole orientation of a fixed single molecule, in facilitating collection of position and orientation data. If an emitter is isotropic, its distance from the microscope's focal plane, Δz, may be gauged. If an emitter is closer to (Δz<0) or further from (Δz>0) the objective than the focal plane, the separation distance of the centers of the two lobes will shrink or grow respectively. This relationship is used to ascertain a depth estimate (e.g., as in FIGS. 1e and 1f in Appendix A).

The 3D positions of molecules within a given polarization channel may be determined using one or more of a variety of approaches. In some embodiments, a double-lobed image is identified from candidate molecules using a template matching algorithm, making use of a template library including of simulated images of fixed dipoles and isotropic emitters. Then, using the MATLAB command lsqnonlin, a function composed of two Gaussians and a constant offset is fit to each candidate single-molecule image, in which the means, amplitudes and covariance matrices of each Gaussian, as well as the constant offset are treated as variable parameters. The x-y position of the single molecule is estimated as the midpoint between the two Gaussians. The depth of the molecule is inferred from the separation distance between the Gaussians and the calibration data. An example of such an approach is depicted in Figure S5(a) of Appendix B. Once molecules have been found in a given polarization channel, their linear dichroisms (LDs) are determined by pairing the localizations between the two channels. For simulations involving fixed molecules, this task may be omitted, since only one molecule appears in each frame of data. Furthermore, for fixed DCDHF-N-6 molecules at low concentration, only a few individual molecules can be analyzed, and their images can be located in both polarization channels by hand. However, for Alexa-647 labeled microtubules in a blinking buffer, the pairing of localizations between channels can be automated such as by employing the Munkres assignment algorithm. Given a list of molecules in the T- and R-polarization channels, as well as a user-provided coordinate transformation that maps the position of a molecule in the T-channel to where it ought to appear in the R-channel, the Munkres algorithm computes the 'cost' of a pairing of a T- and R-channel localization as the square of the Euclidean distance between its R-channel coordinates and transformed T-channel coordinates. The algorithm attempts to pair all localizations in the T-channel to appropriate localizations in the R-channel, while minimizing the sum of the associated costs. If a suitable match for a molecule in the T-channel is not found within 1 μm of an R-channel localization (after coordinate transformation), that molecule is discarded.

In certain embodiments, in order to construct an appropriate coordinate transformation, relating positions on an EMCCD detector in the T-channel to those in the R-channel a microscope coverslip spin-coated with fluorescent beads (FluoSpheres, 200 nm, 625/645, Invitrogen) immobilized in polyvinyl alcohol is imaged. Individual beads are manually identified in both polarization channels, and used as 'control points' for determining a linear coordinate transformation between channels. With ~10-20 control points, a sub-micron accurate coordinate transformation can be established using the MATLAB function cp2tform. This transformation is sufficiently accurate for pairing localizations and thus computing LDs. However, in some embodiments, localizations from the two different imaging channels are precisely overlayed using a more sophisticated image-mapping (e.g., such as that developed in Gahlmann et al., Nano Lett. 13 (3), 987-993, which is fully incorporated herein by reference). In implementations in which the molecules labeling a microtubule sample are quite bright, the R-channel localizations can be used for computing LDs, and localization data is not used for super-resolution (e.g., only T-channel localization data may be used for certain applications). For experiments with immobilized molecules in which the coordinate transformation between polarization channels is known exactly (i.e., the identity matrix), localization data can be used from whichever channel provided more photons for a given molecule. Table ST1 in Appendix B provides an exemplary flowchart of data-processing protocols for both simulated and experimental data.

Single molecules are localized from BSP images using a variety of approaches. In one embodiment, for a given polarization channel, a template matching procedure is used to identify candidate molecules within a frame of raw data, such as by implementing an approach as described in M. D. Lew, A. R. S. Diezmann and W. E. Moerner, Protocol Exchange (2013). DOI: 10.1038/protex.2013.026, which is fully incorporated herein by reference. A Gaussian function is fit to each lobe in the PSF, and the x-y position of the molecule is calculated as the midpoint between the centers of the two lobes. A z-position is inferred from the distance between the two lobe centers (e.g., using a calibration z-scan using a fluorescent bead for generating a lookup-table relating lobe spacing to depth). This localization method may be referred to as 'double-Gaussian' fitting. For each molecule, two more parameters are calculated for relating to lobe asymmetry (LA) and linear dichroism (LD), as:

$$LA_{T,R} = \frac{L_1 - L_2}{L_1 + L_2}, \quad LD = \frac{A_T - A_R}{A_T + A_R} \quad (2)$$

where $A_{T,R}$ is the number of background-subtracted photons contained in one polarization channel attributed to a given molecule, and $L_{1,2}$ is the number of photons contained in one lobe of the PSF in a given polarization channel. Different lobe asymmetries may be calculated for the T and R polarization channels. In various embodiments, LA and LD may be respectively calculated using approaches such as those described in M. P. Backlund, M. D. Lew, Adam S. Backer, S. J. Sahl, et al., Proc. Natl. Acad. Sci. U.S.A. 109, 19087 (2012), and in J. R. Lakowicz, *Principles of Fluorescence Spectroscopy*, 3rd edn. (Springer Science, New York, 2006), which are fully incorporated herein by reference.

Together, $LA_{T,R}$ and LD may be compared to simulated images to determine a molecule's orientation. Additionally, in connection with one or more embodiments it has been recognized/discovered by simulating a library of molecules at different orientations and Δz values (such as in supplemental Figures S1-S3 in Appendix B), molecules with high LA are tilted significantly away from θ=0 or 90 degrees, and are therefore more susceptible to mislocalization on account of their asymmetrical PSF. In this regard, various embodiments employ the recognition that localization in a given polarization channel is inaccurate beyond the photon-limited precision if the LA exceeds 0.5, with images of molecules with an LA exceeding this threshold being rejected to 'prune' spurious localizations and recover an underlying structure with desirable fidelity.

Various embodiments relating to such a pruning approach, including experimental-type embodiments, are characterized in the Appendices in the above-referenced provisional patent application, such as those in Appendix A and in Appendix B as directed to generating simulated images with a 100×1.4NA objective and matched imaging media n=1.518, of single molecules labeling two parallel, infinitely thin sheets at 10 μm long and 500 nm in the z direction. Sheet separation distance may be varied and the resolving capabilities of the standard clear-aperture (CA) and pruned BSP imaging modalities can be compared. Each CA image can be fit with a Gaussian and each BSP image fit with a double-Gaussian, with localization corresponding to the polarized BSP image with lower intensity discarded for each molecule. Resulting reconstructions for d=60 nm are inset in FIG. 2a of Appendix A, showing structures with desirable resolution. The lobe separation distance varies significantly as a function of orientation (see Figure S4 of Appendix B). In the case of rotationally fixed molecules, orientation is simultaneously estimated using an MLE-based fitting method if Δz is determined. A plot of the resolution ratio $\chi(S_{max})$, a parameter expressing the ability to separate the two sheets, is shown in FIG. 2b of Appendix A, with BSP enhancing resolving capability where $S_{max} \geq 1000$ photons.

As may be implemented with various embodiments, FIG. 3a of Appendix A plots drift-corrected x-y positions of a sample molecule inferred from CA and BSP images as a function of Δz, in which a molecule's orientation may be estimated by least-squares fitting of the total number of photons contained in each lobe of the bisected pupil image at Δz=0 nm to simulations of a dipole at an air-glass interface. Sample simulated and experimentally acquired images are shown in FIG. 3b of Appendix A, demonstrating that for molecules moderately inclined towards the optical axis, a considerably reduced x-y shift is observed with BSP imaging.

As may be implemented with one or more embodiments, supplementary Figure S5 of Appendix B contains information regarding an embodiment involving calibration of depth estimation, and localization precision data. Table ST1 in Appendix B describes an image processing pipeline. FIG. 4a of Appendix A depicts a super-resolution BSP 3D reconstruction, generated by binning localizations into 25-nm pixels, and color-coding by depth. In FIG. 4b of Appendix A, histograms of the LA and LD of molecules detected in a T-channel are plotted, demonstrating that |LA|<<0.5 for the vast majority of molecules. Inset 4a.iii depicts a super-resolved image, color coded according to the LA and LD of the individual molecules detected, confirming low-magnitude measurements for both of these parameters. Figure S6 of Appendix B shows a super-resolved reconstruction of the entire field of view used to generate LA/LD histograms.

Various blocks, modules or other circuits may be implemented to carry out one or more of the operations and activities described herein and/or shown in the figures. In these contexts, a "block" (also sometimes referred to as "logic circuitry" or "module") is a circuit that carries out one or more of these or related operations/activities (e.g., as depicted in one or more blocks, or circuit components, as shown in FIG. 1). For example, in certain of the above-discussed embodiments, one or more modules are discrete logic circuits or programmable logic circuits configured and arranged for implementing these operations/activities, as in the circuit modules shown in FIG. 1. Similarly, a phase mask refers to an optical component, being an optical component or structure that uses phase characteristics of light to effect the passage of light. In various contexts, such a phase mask operates to alter the passage of light based on the phase of the light, such as characterized herein (e.g., to route light into distinct portions that are separately detectable).

In certain embodiments, a programmable circuit as noted above is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions, and the second module includes a second CPU hardware circuit with another set of instructions.

Certain embodiments are directed to a computer program product (e.g., non-volatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, various imaging processing circuits may be implemented as discussed herein. In addition, the various embodiments described herein may be combined in certain embodiments, and various aspects of individual embodiments may be implemented as separate embodiments. Such modifications do not depart from the true spirit and scope of various aspects of the disclosure, including aspects set forth in the claims.

What is claimed is:

1. An apparatus comprising:
    a phase mask;
    a microscope having
        an objective, and
        a detection pathway configured and arranged with the phase mask therein and for passing light from the objective; and
    circuitry configured and arranged with the phase mask and microscope to characterize the depth of an individual object within a specimen, and to characterize rotational mobility of a feature corresponding to the individual object, based on detected light passed via the microscope and the phase mask, wherein the phase mask is configured and arranged with the microscope to pass the light from the objective with the light in respective lobes spaced apart by a distance, and providing an indication of depth of the object based on the distance.

2. The apparatus of claim 1, wherein
    the phase mask is an optical component configured and arranged to differently route respective portions of the light based on phase characteristics of the respective portions of light, and
    the circuitry includes optical detectors configured and arranged to detect the light passed via the microscope and phase mask, and to provide the characterization of depth and rotational mobility via the detected light.

3. The apparatus of claim 1, wherein the phase mask is configured and arranged with the microscope to pass the light from the objective by splitting the light into the respective lobes spaced apart by a distance.

4. The apparatus of claim 1, wherein the phase mask is configured and arranged with the microscope to provide the indication of depth by providing the lobes spaced apart at a first distance for an object at a first depth into the specimen, and to provide the lobes spaced apart at a second distance that is greater than the first distance for the object at a second depth into the specimen, the second depth being greater than the first depth.

5. The apparatus of claim 1, wherein the phase mask is configured and arranged with the microscope to provide an indication of the rotational mobility of the feature via asymmetrical characteristics of the lobes.

6. The apparatus of claim 1, wherein the phase mask is configured and arranged with the microscope to characterize the rotational mobility of the feature based on one or more characteristics selected from the group consisting of: linear dichroism and asymmetry of portions of light separated by the phase mask.

7. The apparatus of claim 1, wherein the phase mask is configured and arranged with the microscope to provide the rotational mobility of the feature by providing images of ensembles of particles having anisotropic angular emission distributions.

8. The apparatus of claim 1, wherein the phase mask is configured and arranged with the microscope and the circuitry to characterize the rotational mobility of the feature by generating respective three-dimensional images of the object at different times as the object moves in the specimen.

9. The apparatus of claim 1, wherein the individual object is a light-emitting structure smaller than a diffraction limit of the microscope, and each feature is an individual molecule.

10. The apparatus of claim 1, wherein the phase mask and the microscope are configured and arranged to, as part of a dual-polarization optical Fourier processing system, measure both depth and dipole orientation of individual fluorescent molecules from a single image.

11. The apparatus of claim 1, wherein the phase mask includes a linear, wedge shaped phase ramp that partitions a microscope pupil and is configured and arranged to split light from the specimen into at least two portions.

12. An Apparatus comprising:
a phase mask: a microscope having
   an objective, and
   a detection pathway configured and arranged with the phase mask with the light in respective lobes therein and for passing light from the objective; and
circuitry configured and arranged with the phase mask and microscope to characterize the depth of an individual object within a specimen, and to characterize rotational mobility of a feature corresponding to the individual object based on detected light passed via the microscope and the phase mask; and
another phase mask also configured to pass light in respective lobes, wherein the phase masks are configured and arranged with the circuitry and the microscope to characterize individual objects at different positions.

13. An apparatus comprising:
a phase mask;
a microscope having
   an objective, and
   a detection pathway configured and arranged with the phase mask therein and for passing light from the objective; and
circuitry configured and arranged with the phase mask and microscope to characterize the depth of an individual object within a specimen, and to characterize rotational mobility of a feature corresponding to the individual object, based on detected light passed via the microscope and the phase mask;
a Fourier transforming lens; and
a polarizing beam splitter, wherein the phase mask and the microscope are configured and arranged to pass emitted fluorescence from the individual object through the Fourier transforming lens, and to separate the emitted fluorescence into a plurality of imaging channels for light transmitted and reflected by the polarizing beam splitter.

14. The apparatus of claim 13, wherein the polarizing beam splitter is configured and arranged with the microscope and phase mask to provide polarization channels from which the light is modulated as a function of the phase mask.

15. The apparatus of claim 13, wherein the circuitry includes a spatial light modulator configured and arranged with the phase mask to polarize the imaging channels based on an orientation of the phase mask.

16. An apparatus comprising:
a phase mask; and
optics configured and arranged with the phase mask to provide characterization of depth of objects within a specimen, and to provide characterization of rotational mobility of a feature corresponding to each object, by passing light from the object through the phase mask and the optics, wherein the phase mask is configured and arranged to split respective portions of the light into different lobes spaced apart by a distance based on phase characteristics of the respective portions of light, therein providing an indication of depth of the object via the distance.

17. A method comprising:
using a phase mask and a microscope having an objective and a detection pathway, passing light from the objective and via the phase mask along the detection pathway including differently routing respective portions of the light via the phase mask, based on phase characteristics of the respective portions of light, and therein forming two lobes on an image plane spaced apart by a distance which provides an indication of depth of the object; and
based on the light passed via the detection pathway and the phase mask, characterizing the depth of an individual object within a specimen, and characterizing rotational mobility of a feature corresponding to the individual object.

18. The method of claim 17, wherein
characterizing the depth of the individual object includes characterizing the depth based on the distance.

19. The method of claim 17, wherein characterizing the rotational mobility of the feature includes characterizing the rotational mobility based on asymmetrical characteristics of the lobes.

* * * * *